United States Patent
Bradin

(10) Patent No.: US 8,841,494 B2
(45) Date of Patent: Sep. 23, 2014

(54) THERMAL DECOMPOSITION PROCESS OF TRIGLYCERIDE CONTAINING MIXTURES, CO-PROCESSED WITH LOW MOLECULAR WEIGHT OLEFINS TO PRODUCE A RENEWABLE FUEL COMPOSITION

(76) Inventor: David Bradin, Cary, NC (US)

( * ) Notice: Subject to any disclaimer, the term of this patent is extended or adjusted under 35 U.S.C. 154(b) by 827 days.

(21) Appl. No.: 13/088,789

(22) Filed: Apr. 18, 2011

(65) Prior Publication Data

US 2011/0196179 A1    Aug. 11, 2011

Related U.S. Application Data

(62) Division of application No. 12/065,265, filed as application No. PCT/US2006/034124 on Aug. 29, 2006, now Pat. No. 7,928,273.

(60) Provisional application No. 60/721,394, filed on Sep. 28, 2005, provisional application No. 60/712,538, filed on Aug. 29, 2005.

(51) Int. Cl.

| | | |
|---|---|---|
| *C07C 1/00* | (2006.01) | |
| *C07C 6/08* | (2006.01) | |
| *C10G 2/00* | (2006.01) | |
| *C10G 3/00* | (2006.01) | |
| *C11C 3/00* | (2006.01) | |
| *C10G 47/00* | (2006.01) | |
| *C10L 1/04* | (2006.01) | |
| *C10L 1/14* | (2006.01) | |
| *C11C 3/14* | (2006.01) | |
| *C10L 1/16* | (2006.01) | |

(52) U.S. Cl.
CPC . *C11C 3/006* (2013.01); *C10G 2/32* (2013.01); *C10G 3/50* (2013.01); *C10G 2300/1022* (2013.01); *C11C 3/00* (2013.01); *C10G 3/00* (2013.01); *C10G 47/00* (2013.01); *C10L 1/04* (2013.01); *C10G 2300/1014* (2013.01); *Y02E 50/13* (2013.01); *C10L 1/14* (2013.01); *C11C 3/14* (2013.01); *Y02T 50/678* (2013.01); *C10G 2400/02* (2013.01); *C10G 2300/1018* (2013.01); *C10G 2400/08* (2013.01); *C10G 2300/1025* (2013.01); *C10L 1/1616* (2013.01); *C10G 2400/04* (2013.01)
USPC ............... 585/240; 585/242; 44/605; 44/606

(58) Field of Classification Search
CPC .......... C10L 1/1619; C10L 2200/0484; C10L 2200/00476; C10L 1/14; C10G 3/00; C10G 3/40; C10G 47/00; Y02E 50/13
USPC .............................. 585/240, 242; 44/605, 606
See application file for complete search history.

(56) References Cited

U.S. PATENT DOCUMENTS

| | | | | |
|---|---|---|---|---|
| 4,396,786 A | * | 8/1983 | Bond et al. ..................... | 585/240 |
| 4,992,605 A | * | 2/1991 | Craig et al. .................... | 585/240 |
| 5,527,449 A | * | 6/1996 | Brown et al. ................. | 208/179 |
| 5,705,722 A | * | 1/1998 | Monnier et al. .............. | 585/240 |
| 5,885,444 A | * | 3/1999 | Wansbrough et al. ........ | 208/179 |
| 6,566,568 B1 | * | 5/2003 | Chen ............................. | 585/310 |
| 7,491,856 B2 | * | 2/2009 | Hassan et al. ................. | 568/867 |
| 7,511,181 B2 | * | 3/2009 | Petri et al. ..................... | 585/240 |
| 7,550,634 B2 | * | 6/2009 | Yao et al. ...................... | 585/240 |
| 7,691,159 B2 | * | 4/2010 | Li ................................... | 44/605 |
| 7,718,051 B2 | * | 5/2010 | Ginosar et al. ............... | 208/113 |
| 7,754,931 B2 | * | 7/2010 | Monnier et al. .............. | 585/240 |
| 2002/0062055 A1 | * | 5/2002 | Raulo et al. ................... | 585/739 |

FOREIGN PATENT DOCUMENTS

GB          1524781     *  9/1978

* cited by examiner

*Primary Examiner* — Nina Bhat
(74) *Attorney, Agent, or Firm* — James G. Passe; Passe Intellectual Property, LLC

(57) ABSTRACT

Compositions and methods for forming hydrocarbon products from triglycerides are described. In one aspect, the methods involve the thermal decomposition of fatty acids, which can be derived from the hydrolysis of triglycerides. The thermal decomposition products can be combined with low molecular weight olefins, such as Fischer-Tropsch synthesis products, and subjected to molecular averaging reactions. Alternatively, the products can be subjected to hydrocracking reactions, isomerization reactions, and the like. The products can be isolated in the gasoline, jet and/or diesel fuel ranges. Thus, vegetable oils and/or animal fats can be converted using water, catalysts, and heat, into conventional products in the gasoline, jet and/or diesel fuel ranges. These products are virtually indistinguishable from those derived from their petroleum-based analogs, except that they can have virtually no aromatic, sulfur or nitrogen content, they are derived, in whole or in part, from renewable resources, and can also be derived from domestically available coal and/or natural gas.

14 Claims, No Drawings

THERMAL DECOMPOSITION PROCESS OF TRIGLYCERIDE CONTAINING MIXTURES, CO-PROCESSED WITH LOW MOLECULAR WEIGHT OLEFINS TO PRODUCE A RENEWABLE FUEL COMPOSITION

This application is a divisional application of U.S. nonprovisional application Ser. No. 12/065,265 filed on Feb. 28, 2008 now U.S. Pat. No. 7,928,273, which is a 371 of PCT application number PCT/US06/34124 filed on Aug. 29, 2006, which claims benefit of U.S. provisional application No. 60/721,394 filed Sep. 28, 2005 and U.S. provisional application No. 60/712,538 filed on Aug. 29, 2005, all of which are included herewith in their entirety by reference.

FIELD OF THE INVENTION

The present invention relates to fuel compositions derived in whole or in part from biological, renewable sources. The application claims priority to U.S. Ser. No. 60/712,538, "Improved Biodiesel Fuel, Additives and Lubricants," filed on Aug. 29, 2005, and U.S. Ser. No. 60/721,394, "Improved Distillate Fuel," filed on Sep. 28, 2005. The contents of each of these applications are hereby incorporated by reference.

BACKGROUND OF THE INVENTION

There is currently a strong interest in alternative fuels. These fuels predominantly come from two feedstocks, vegetable oils and sugars. Biodiesel is formed from vegetable oil, and ethanol comes from sugar.

Vegetable oils are mostly comprised of triglycerides, esters of glycerol, $CH_2(OH)CH(OH)CH_2(OH)$, and three fatty acids. Fatty acids are, in turn, aliphatic compounds containing 4 to 24 carbon atoms, ideally between 10 and 18 carbon atoms, and having a terminal carboxyl group. Diglycerides are esters of glycerol and two fatty acids, and monoglycerides are esters of glycerol and one fatty acid. Naturally occurring fatty acids, with only minor exceptions, have an even number of carbon atoms and, if any unsaturation is present, the first double bond is generally located between the ninth and tenth carbon atoms. The characteristics of the triglyceride are influenced by the nature of their fatty acid residues.

Biodiesel fuels are fatty acid ethyl and/or methyl esters. These esters are typically prepared by transesterifying triglycerides, the major component in fats and oils, with ethanol and/or methanol, in the presence of an acid or base catalyst. Biodiesel fuels are associated with some limitations. For example, some research indicates that they cause higher emissions of nitrogen oxides ($NO_x$), increased wear on engine components, and fuel injector coking ("Progress in Diesel Fuel from Crop Oils," AgBiotechnology, (1988)). Also, biodiesel fuel does not provide as much power as petroleum-based diesel is burned (See, for example, Joni, et al., *Hungarian Agricultural Engineering*, 6:7, 27-28 (1993)), and the diesel engines may need to be retuned in order to run efficiently on biodiesel.

Another effort at producing a renewable fuel has involved the thermal conversion of animal carcasses to a liquid oil product and a water-soluble inorganic product. When animal carcasses are heated, at around 250° C., the triglycerides hydrolyze into glycerol and free fatty acids, and at around 500° C., the free fatty acids decarboxylate to form a mixture of products that relate to the hydrocarbon chains in the original fatty acids. This process is known as thermal decarboxylation.

Most automobiles run on gasoline, and airplanes run on jet fuel, not diesel. It would be advantageous to provide a method for forming alternative fuel sources from vegetable oil feedstocks that have tunable molecular weights and octane or cetane ratings, so that a variety of gasoline, jet fuel, or diesel fuel compositions can be prepared as desired. The present invention provides such methods, as well as renewable gasoline, jet fuel, and diesel fuel compositions.

SUMMARY OF THE INVENTION

Fuel additives and fuel compositions, and methods for their preparation and use directly as fuels, or as blends with conventional gasoline, jet, and/or diesel fuel, are disclosed.

Fatty acids are one of the materials used to prepare the fuel additives and/or fuel compositions, and these are subjected to thermal decarboxylation to remove the carboxylic acid group. In one embodiment, all or a portion of these fatty acids are derived from triglycerides and water during the thermal decarboxylation step. That is, triglycerides are hydrolyzed to fatty acids and glycerol at temperatures lower than the thermal decarboxylation, so fatty acids can be produced from triglycerides during the thermal decarboxylation step. The resulting decarboxylated products comprise hydrocarbons in the $C_{10-20}$ range, and, depending on the starting materials, include one or more double bonds. Hydrocarbons that do not already include a double bond can be subjected to dehydrogenation conditions to provide a double bond.

Representative feedstocks for the thermal decarboxylation include animal fat, vegetable oil, trap grease or other sources rich in fatty acids, fatty acids, and mixtures thereof. In one embodiment, the fat present in animal carcasses can be subjected to thermal decarboxylation conditions to form all or part of the thermal decarboxylation products. However, in a preferred aspect, vegetable oil and/or animal fat are used, rather than entire animal carcasses.

Low molecular weight olefins are another of the materials used to prepare the fuel additives. Low molecular weight olefins are those in the $C_{2-8}$ range, for example, those in the $C_{2-4}$ range. These olefins can be derived from a variety of sources, including hydrocracking of petroleum feedstocks, Fischer-Tropsch synthesis using catalysts with low chain probabilities, and the like. When they are derived from Fischer-Tropsch synthesis, a variety of domestic feedstocks can be used, for example, coal and natural gas. Additionally, renewable feedstocks such as alcohols, lignin, and the like can also be used.

The thermal decarboxylation products, which either include or are modified by dehydrogenation to include carbon-carbon double bonds, are combined with low molecular weight olefins, and subjected to olefin metathesis (also known as molecular averaging) conditions. Olefin metathesis produces a product mixture that includes a roughly Gaussian distribution of olefinic products with a molecular weight reflecting the average molecular weight of the olefinic starting materials.

Gasoline predominantly includes hydrocarbons in the molecular weight range of $C_{5-9}$, for example, $C_{6-8}$, so the combination of low molecular weight olefins (with an ideal molecular weight of $C_{2-4}$), and the thermal decarboxylation products (with an ideal molecular weight of $C_{10-20}$), flank both ends of this range. Molecular averaging can therefore provide a hydrocarbon product stream predominantly in the gasoline range (and the hydrocarbons outside the range can be re-subjected to molecular averaging to provide an additional product stream). Gasoline tends to include isoparaffins, so while intermediate $C_{5-9}$-containing fractions, for example, $C_{6-8}$ fractions, can advantageously be isolated for direct use or sale, they can also be subjected to additional processing steps, such as isomerization and hydrotreatment.

Diesel fuel has a preferred molecular weight range of $C_{10-20}$, ideally at the lower end of this range. By selecting appropriate ratios of low molecular weight olefins and thermal decarboxylation products, yields of products in the diesel range can be maximized. As the products include carbon-carbon double bonds, an optional hydrotreatment step may be performed.

There are many types of jet fuel, including kerosene-type jet fuel and wide-cut jet fuel. Kerosene-type jet fuel has a carbon number distribution between about 8 and 16 carbon numbers; wide-cut jet fuel, between about 5 and 15 carbon numbers. By judicious selection of the amount of low molecular weight olefins and thermal decarboxylation products, and using appropriate distillation conditions to separate the products of the molecular averaging, olefins in either jet fuel range can be provided. These can be used as is, or hydrotreated to hydrogenate the double bonds.

In an alternative embodiment, the thermal decarboxylation products are subjected to hydrocracking to provide products in a desired molecular weight range, isomerization to provide products with a desired degree of branching, or hydrotreating/hydrofinishing steps, without first being subjected to molecular averaging conditions. The desired molecular weight range and degree of branching will, of course, depend on whether it is desired to provide a diesel, gasoline, or jet fuel composition, or additive for including in such compositions.

Alternative fuel compositions including the resulting products can be prepared by blending the products with gasoline, diesel fuel, or jet fuel, as appropriate. In one embodiment, the resulting alternative fuel contains between approximately 25 and 98 percent petroleum-based gasoline, diesel or jet fuel and between approximately 2 and 75 percent of the products from the molecular averaging or post-treatment steps.

DETAILED DESCRIPTION OF THE INVENTION

Fuel compositions, as well as methods for preparing the compositions, are disclosed. The fuel composition can be used as gasoline, jet fuel, and/or diesel fuel, or used as additives to such fuels.

In its broadest aspect, the present invention is directed to an integrated process for producing fuels, including jet fuel, gasoline and diesel. The process involves the thermal decarboxylation of fatty acids to form a thermal decarboxylation product, which is combined with a low molecular weight olefin fraction and subjected to olefin metathesis (molecular averaging) conditions. Fractions in the distillate fuel range can be isolated from the reaction mixture, for example, via fractional distillation. The product of the molecular averaging reaction tends to be highly linear, but can be subjected to catalytic isomerization to improve the octane values and lower the pour, cloud and freeze points, if desired. The olefins can be hydrogenated (i.e., using hydrotreatment conditions), if desired. The resulting composition has a relatively low sulfur concentration, and relatively high octane values, and can be used in gasoline compositions.

In some embodiments, the processes described herein are integrated processes. As used herein, the term "integrated process" refers to a process which involves a sequence of steps, some of which may be parallel to other steps in the process, but which are interrelated or somehow dependent upon either earlier or later steps in the total process.

There are numerous advantages provided by the processes described herein. The processes convert lower molecular weight olefins and thermal decarboxylation products, both of which tend to be outside the range of gasoline, diesel and/or jet fuel, into products within these ranges. Molecular averaging reactions tend to work better the closer the feedstocks are to the final desired molecular weight, and these feedstocks closely flank the desired molecular weight. Accordingly, it would be hard to provide better feedstocks for molecular averaging to arrive at the desired products. Since the process uses bio-based materials in at least the thermal decarboxylation step, and domestic coal and/or natural gas can be used to provide low molecular weight olefins, the process, and resulting fuel, can lower reliance on foreign oil and reduce greenhouse gases. Olefin metathesis has a lower energy cost than hydrocracking, making the process economically viable. Finally, the resulting fuel is highly paraffinic, and has relatively low levels of sulfur, nitrogen and polynuclear aromatic impurities, making it environmentally advantageous.

The following definitions will further define the invention:

The term "alkyl", as used herein, unless otherwise specified, refers to a saturated straight, branched, or cyclic hydrocarbon of $C_{1-6}$, and specifically includes methyl, ethyl, propyl, isopropyl, butyl, isobutyl, t-butyl, pentyl, cyclopentyl, isopentyl, neopentyl, hexyl, isohexyl, cyclohexyl, 3-methylpentyl, 2,2-dimethylbutyl, and 2,3-dimethylbutyl.

The term "olefin" refers to an unsaturated straight, branched or cyclic hydrocarbon of $C_{2-10}$, and specifically includes ethylene, propylene, butylene, isobutylene, pentene, cyclopentene, isopentene, hexene, cyclohexene, 3-methylpentene, 2,2-dimethylbutene, 2,3-dimethylbutene, 1-heptene, 2-heptene, 3-heptene, 1-octene, 2-octene, 3-octene, 4-octene, 1-nonene, 2-nonene, 3-nonene, 4-nonene, 1-decene, 2-decene, 3-decene, 4-decene, and 5-decene. Ethylene, propylene, butylenes, and isobutylene can be preferred due to their relatively low cost, and $C_{2-8}$ olefins, or, preferably, $C_{2-4}$ olefins (low molecular weight olefins) can be preferred. Low molecular weight olefins can include other olefins outside the $C_{2-4}$ range, but ideally, the majority (51% or more) of the olefins in a low molecular weight olefin feedstock are in this range. In one embodiment, the olefins comprise substituted olefins.

I. Fuel Composition

The fuel composition prepared using the processes described herein can include alkanes in the gasoline, jet fuel and/or diesel fuel ranges, as desired. While thermal decarboxylation products are present, the composition can optionally include fatty acid alkyl esters, which can provide adequate lubrication when used in an amount of about 2 percent by volume or more.

The hydrocarbons produced using the processes described herein typically have average molecular weights in the $C_{5-20}$ range. The molecular weight can be controlled by adjusting the molecular weight and proportions of the decarboxylated fatty acids ($C_{10-20}$ range), and the low molecular weight olefins, that are subjected to molecular averaging (olefin metathesis) conditions. Fuel compositions with boiling points in the range of between about 68-450° F., more preferably between about 250-370° F., are preferred. The currently most preferred average molecular weight is around $C_{8-20}$, which has a boiling point in the range of roughly 345° F., depending on the degree of branching. Specifications for the most commonly used diesel fuel (No. 2) are disclosed in ASTM D 975 (See, for example, p. 34 of 1998 Chevron Products Company Diesel Fuels Tech Review). The minimum flash point for diesel fuel is 52° C. (125° F.). Specifications for jet fuel are disclosed in ASTM D 1655, standard Specification for Aviation Turbine Fuels. The minimum flash point for jet fuel is typically 38° C.

The process is adaptable to generate higher molecular weight fuels, for example, those in the $C_{15-20}$ range, or lower molecular weight fuels, for example, those in the $C_{5-8}$ range. Preferably, the majority of the composition includes compounds within about 8, and more preferably, within about 5 carbons of the average. Another important property for the fuel is that it has a relatively high flash point for safety reasons. Preferably, the flash point is above 90° C., more preferably above 110° C., still more preferably greater than 175° C., and most preferably between 175° C. and 300° C.

The fuel can also be used as a blending component with other fuels. For example, the fuel can be used as a blending component with fuels derived from crude oil or other sources.

II. Components Used to Prepare the Fuel Composition

A. Free Fatty Acids/Triglycerides

Any source of triglycerides or free fatty acids can be used that provides a fuel additive composition with the desired properties. Preferred sources of triglycerides for use in practicing the present invention include, but are not limited to, vegetable oils and fats, as well as animal oils and fats. Examples of suitable vegetable oils include, but are not limited to, crude or refined soybean, corn, coconut (including copra), palm, rapeseed, cotton and oils. Examples of suitable animal fats include, but are not limited to, tallow, lard, butter, bacon grease and yellow grease. Naturally-occurring fats and oils are the preferred source of triglycerides because of their abundance and renewability. Oils with a higher boiling point are preferred over oils with a lower boiling point. Animal carcasses can be used, though this may not be preferred due to the presence of various by-products (i.e., compounds other than decarboxylated fatty acids) in the thermal decarboxylation product stream (although the by-products can be removed, if desired).

Free fatty acids, alone or in combination with the triglycerides, can be used. However, because the conditions which result in thermal decomposition of free fatty acids are also more than sufficient (when water is present) to also hydrolyze the triglycerides in animal fats/vegetable oils to free fatty acids, it can be advantageous to start with triglycerides. Trap grease is relatively inexpensive, and includes both fatty acids and triglycerides. While trap grease is not an ideal feedstock for conventional biodiesel synthesis, it is an ideal feedstock for the thermal decarboxylation process.

B. Olefins

Olefins suitable for the molecular averaging step are preferably $C_{2-10}$, more preferably, $C_{2-8}$, and, most preferably, $C_{2-4}$ olefins, and include straight, branched, or cyclic olefins. It is preferred that these olefins contain only hydrogen and carbon. In one embodiment, the olefins are a mixture of olefins, in unpurified form, obtained by the hydrocracking of petroleum-based products.

A preferred olefin stream is that derived from Fischer-Tropsch synthesis, ideally using a catalyst with low chain probabilities, such as an iron catalyst, which tends to provide a $C_{2-8}$ olefin stream, with the predominance of olefins in the $C_{2-4}$ range. The relatively low molecular weight of the Fischer-Tropsch products, combined with the relatively high molecular weight of the thermal decarboxylation products, provides an ideal average molecular weight for producing distillate fuel compositions.

C. Additional Components

The fuel compositions can include various additives, such as lubricants, emulsifiers, wetting agents, densifiers, fluid-loss additives, corrosion inhibitors, oxidation inhibitors, friction modifiers, demulsifiers, anti-wear agents, anti-foaming agents, detergents, rust inhibitors and the like. Other hydrocarbons, such as those described in U.S. Pat. No. 5,096,883 and/or U.S. Pat. No. 5,189,012, can be blended with the fuel, provided that the final blend has the necessary octane/cetane values, pour, cloud and freeze points, kinematic viscosity, flash point, and toxicity properties. The total amount of additives is preferably between 50-100 ppm by weight for 4-stroke engine fuel, and for 2-stroke engine fuel, additional lubricant oil may be added.

Diesel fuel additives are used for a wide variety of purposes; however, they can be grouped into four major categories: engine performance, fuel stability, fuel handling, and contaminant control additives.

Engine performance additives can be added to improve engine performance. Cetane number improvers (diesel ignition improvers) can be added to reduce combustion noise and smoke. 2-Ethylhexyl nitrate (EHN) is the most widely used cetane number improver. It is sometimes also called octyl nitrate. EHN typically is used in the concentration range of 0.05% mass to 0.4% mass and may yield a 3 to 8 cetane number benefit. Other alkyl nitrates, ether nitrates some nitroso compounds, and di-tertiary butyl peroxide can also be used.

Fuel and/or crankcase lubricant can form deposits in the nozzle area of injectors—the area exposed to high cylinder temperatures. Injector cleanliness additives can be added to minimize these problems. Ashless polymeric detergent additives can be added to clean up fuel injector deposits and/or keep injectors clean. These additives include a polar group that bonds to deposits and deposit precursors and a non-polar group that dissolves in the fuel. Detergent additives are typically used in the concentration range of 50 ppm to 300 ppm. Examples of detergents and metal rust inhibitors include the metal salts of sulfonic acids, alkylphenols, sulfurized alkylphenols, alkyl salicylates, naphthenates and other oil soluble mono and dicarboxylic acids such as tetrapropyl succinic anhydride. Neutral or highly basic metal salts such as highly basic alkaline earth metal sulfonates (especially calcium and magnesium salts) are frequently used as such detergents. Also useful is nonylphenol sulfide. Similar materials can be prepared by reacting an alkylphenol with commercial sulfur dichlorides. Suitable alkylphenol sulfides can also be prepared by reacting alkylphenols with elemental sulfur. Also suitable as detergents are neutral and basic salts of phenols, generally known as phenates, wherein the phenol is generally an alkyl substituted phenolic group, where the substituent is an aliphatic hydrocarbon group having about 4 to 400 carbon atoms.

Lubricity additives can also be added. Lubricity additives are typically fatty acids and/or fatty esters. Examples of suitable lubricants include polyol esters of $C_{12-28}$ acids. The fatty acids are typically used in the concentration range of 10 ppm to 50 ppm, and the esters are typically used in the range of 50 ppm to 250 ppm.

Some organometallic compounds, for example, barium organometallics, act as combustion catalysts, and can be used as smoke suppressants. Adding these compounds to fuel can reduce the black smoke emissions that result from incomplete combustion. Smoke suppressants based on other metals, e.g., iron, cerium, or platinum, can also be used.

Anti-foaming additives such as organosilicone compounds can be used, typically at concentrations of 10 ppm or less. Examples of anti-foaming agents include polysiloxanes such as silicone oil and polydimethyl siloxane; acrylate polymers are also suitable.

Low molecular weight alcohols or glycols can be added to diesel fuel to prevent ice formation. Additional additives can lower a diesel fuel's pour point (gel point) or cloud point, or improve its cold flow properties.

Drag reducing additives can also be added to increase the volume of the product that can be delivered. Drag reducing additives are typically used in concentrations below 15 ppm.

Antioxidants can be added to the distillate fuel to neutralize or minimize degradation chemistry, typically in the concentration range of 10 ppm to 80 ppm. Examples of antioxidants include those described in U.S. Pat. No. 5,200,101.

Acid-base reactions are another mode of fuel instability. Stabilizers such as strongly basic amines can be added, typically in the concentration range of 50 ppm to 150 ppm, to counteract these effects.

Metal deactivators can be used to tie up (chelate) various metal impurities, neutralizing their catalytic effects on fuel performance. They are typically used in the concentration range of 1 ppm to 15 ppm.

Multi-component fuel stabilizer packages may contain a dispersant. Dispersants are typically used in the concentration range of 15 ppm to 100 ppm.

Biocides can be used when contamination by microorganisms reaches problem levels, typically used in the concentration range of 200 ppm to 600 ppm.

Demulsifiers are surfactants that break up emulsions and allow fuel and water phases to separate, and are typically are used in the range of 5 ppm to 30 ppm.

Dispersants are well known in the lubricating oil field.

Corrosion and oxidation inhibitors are compounds that attach to metal surfaces and form a barrier that prevents attack by corrosive agents, and are typically are used in the range of 5 ppm to 15 ppm.

Friction modifiers, such as fatty acid esters and amides, glycerol esters of dimerized fatty acids, and succinate esters or metal salts thereof, can be used.

Pour point depressants such as $C_{8-18}$ dialkyl fumarate vinyl acetate copolymers, polymethacrylates and wax naphthalene, can be used.

Examples of anti-wear agents include zinc dialkyldithiophosphate, zinc diary diphosphate, and sulfurized isobutylene. Additional additives are described in U.S. Pat. No. 5,898,023 to Francisco, et al.

III. Alternative Fuel Composition

The fuels prepared as described herein can be used directly, or combined with conventional fuels to form an alternative fuel composition. When formulated as gasoline, diesel or jet fuels, the compositions can be combined with gasoline, diesel and/or jet fuels, as appropriate, or used as is, to run gasoline, diesel and/or jet engines. The blended ratios with petroleum-based fuels are typically such that the resulting blended fuel composition ideally contain between about 25 to about 98 percent of the conventional fuel and between about 2 to about 75 percent of the compositions described herein. The components can be mixed in any suitable manner.

IV. Methods for Preparing the Fuel Composition

A. Hydrolysis

If one starts with triglycerides, the first step in the process involves either hydrolysis or saponification of the triglyceride to form free fatty acids and glycerol. Conditions for hydrolyzing/saponifying triglycerides are well known to those of skill in the art. Although triglycerides can be hydrolyzed during the thermal decarboxylation step, they can also be hydrolyzed beforehand. Any acid catalyst that is suitable for performing triglyceride hydrolysis can be used, in any effective amount and any effective concentration. Examples of suitable acids include, but are not limited to, hydrochloric acid, hydrobromic acid, sulfuric acid, nitric acid, and solid catalysts such as Dowex 50™.

The presence of glycerol and water in the subsequent thermal decarboxylation step is not deleterious, although to increase throughput, it may be desirable to remove the glycerol/water fraction before thermal decarboxylation.

In one aspect, the hydrolysis occurs in a batch-type process, where water, triglycerides and an acid catalyst are heated until the hydrolysis is complete. The resulting aqueous phase includes glycerol, water, and, if the acid catalyst is water soluble, an acid. In another aspect, the triglycerides are thermally hydrolyzed by heating them with water at a temperature at or near, and, ideally, above, the boiling point of water. High pressure steam (steam hotter than the boiling point of water) can quickly hydrolyze triglycerides to glycerol and free fatty acids.

B. Thermal Decarboxylation of Free Fatty Acids

Free fatty acids are converted to alkanes via thermal decarboxylation. In one aspect, the thermal decarboxylation of fatty acids is performed in the same step in which a triglyceride is hydrolyzed to form glycerol/water and free fatty acids.

In a batch or continuous process, water and triglycerides, or free fatty acids by themselves, are subjected to thermal decarboxylation conditions. Typically, this involves heating the triglycerides and water, or free fatty acids, to a temperature of between 400-600° C. This can be performed in stages, such as, for example, a first stage heated to a temperature between about 100 and about 300° C., ideally between about 150 and 250° C., to perform the hydrolysis step, and a second stage, where the temperatures are between about 400 and about 600° C., where thermal decarboxylation and, likely, some degree of chain shortening occurs.

By-products, including primarily carbon dioxide, hydrogen, glycerol, and water, can be separately collected. The hydrogen and carbon dioxide can be collected, with the hydrogen ideally being separated from the carbon dioxide. The hydrogen can be used as part of a syngas feed for a Fischer-Tropsch synthesis, for hydrocracking, for hydrofinishing, and/or other processing steps.

In another aspect, the triglyceride hydrolysis and the thermal decarboxylation of the resulting fatty acids is performed in a continuous process using a static mixer or other suitable means for mixing high pressure steam and triglycerides. The high pressure steam and triglycerides initially form the glycerol/water stream, and the fatty acids then form the decarboxylation products, including carbon dioxide and hydrogen. Using a static mixer or similar apparatus, the hydrogen and carbon dioxide gases thus formed can flow in the direction of the other products. Since the other products (glycerol/water/hydrocarbons) tend to liquefy at higher temperatures than the hydrogen and carbon dioxide, use of a static mixer can both facilitate collection of the gases and minimize pressure and foaming in the reactor, as might otherwise occur in a batch process in which water and fatty acids are heated above the boiling points of either. The hydrolysis and decarboxylation reactions can occur in a time frame suitable for using a static mixer or other suitable mixing apparatus in a continuous process, and the shorter contact times can minimize product degradation, as has been reported in cases where whole animal carcasses have been subjected to these types of elevated temperatures and pressures.

The glycerol/water fraction passes through the process at a relatively high temperature, and will remain at such a high temperature until it either cools on its own, or is cooled. However, by judicious selection of the configuration of the physical plant, the hot glycerol/water fraction, and optionally the hydrogen gas, can be sent immediately to a syngas generator, where the heat can be used in the syngas generation step and, thus, not wasted. The hot hydrocarbon fraction can similarly be subjected to additional process steps before the heat energy passed to the fraction during the thermal decarboxylation step is lost, or heat exchangers can be used to recover a portion of the heat energy. Thus, it can be possible to recover much of the energy utilized to hydrolyze the triglycerides and thermally decarboxylate the free fatty acids in convergent downstream process steps.

C. Fischer-Tropsch Chemistry

Fischer-Tropsch chemistry typically provides either a light gas/naphtha product or a wax/heavy fraction, depending on whether catalysts with low chain probabilities or high chain probabilities are used. One approach for preparing fuels is to perform Fischer-Tropsch synthesis under conditions which maximize the yield of light gases, and minimize the yield of heavier products such as waxes. The olefin metathesis step described herein advantageously combines thermal decarboxylation products and low molecular weight olefins, so if the olefins are derived from Fischer-Tropsch synthesis, it is preferred that the synthesis is performed using a catalyst with low chain probabilities.

Fischer-Tropsch synthesis uses syngas (mixtures of carbon monoxide and hydrogen) as a feedstock. Syngas can be formed from a variety of sources, including coal, natural gas, alcohols, lignin, and the like. Syngas generators are well known to those of skill in the art. Syngas is converted to liquid hydrocarbons by contact with a Fischer-Tropsch catalyst under reactive conditions. Depending on the quality of the syngas, it may be desirable to purify the syngas prior to the Fischer-Tropsch reactor to remove carbon dioxide produced during the syngas reaction and any sulfur compounds, if they have not already been removed. This can be accomplished by contacting the syngas with a mildly alkaline solution (e.g., aqueous potassium carbonate) in a packed column. An advantage of using fuels prepared from syngas is that they do not contain significant amounts of nitrogen or sulfur and generally do not contain aromatic compounds. Accordingly, they have minimal health and environmental impact.

The Fischer-Tropsch reaction is typically conducted at temperatures between about 300° F. and 700° F. (149° C. to 371° C.), preferably, between about 400° F. and 550° F. (204° C. to 228° C.). The pressures are typically between about 10 and 500 psia (0.7 to 34 bars), preferably between about 30 and 300 psia (2 to 21 bars). The catalyst space velocities are typically between about from 100 and 10,000 cc/g/hr, preferably about 300 and 3,000 cc/g/hr.

The reaction can be conducted in a variety of reactors for example, fixed bed reactors containing one or more catalyst beds, slurry reactors, fluidized bed reactors, or a combination of different type reactors.

In a preferred embodiment, the Fischer-Tropsch reaction is conducted in a bubble column slurry reactor. In this type of reactor synthesis gas is bubbled through a slurry that includes catalyst particles in a suspending liquid. Typically, the catalyst has a particle size of between 10 and 110 microns, preferably between 20 and 80 microns, more preferably between 25 and 65 microns, and a density of between 0.25 and 0.9 g/cc, preferably between 0.3 and 0.75 g/cc.

The low molecular weight olefin fraction can be formed from Fischer-Tropsch synthesis, and also through various modifications of the literal Fischer-Tropsch process by which hydrogen (or water) and carbon monoxide (or carbon dioxide) are converted to hydrocarbons (e.g., paraffins, ethers, etc.) and to the products of such processes. Thus, the term Fischer-Tropsch type product or process is intended to apply to Fischer-Tropsch processes and products and the various modifications thereof and the products thereof. For example, the term is intended to apply to the Kolbel-Engelhardt process typically described by the reaction:

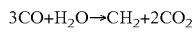

$$3CO+H_2O \rightarrow CH_2+2CO_2$$

Suitable catalysts, supports and promoters for separately forming the low molecular olefins are described in detail below.

i. Catalysts With Low Chain Growth Probabilities

Suitable catalysts that provide relatively low (alpha values of between 0.600 and 0.700) to moderate (alpha values of between 0.700 and 0.800) chain growth probabilities tend to provide high yields of light ($C_{2-8}$) alpha olefins. Such catalysts are well known to those of skill in the art. Preferably, the catalyst used in the first stage is an iron-containing catalyst. Iron itself can be used and, when iron oxides are formed, can be reduced with hydrogen back to iron. However, because the presence of iron fines in the product stream is not preferred, and because iron oxides (rust) decrease the surface area of the catalyst available for reaction, other iron-containing catalysts are preferred. Examples of suitable iron-containing catalysts include those described in U.S. Pat. No. 4,544,674 to Fiato et al.

In a preferred embodiment, the iron catalysts include at least about 10 to about 60 weight percent iron. More preferably, they include between about 20 to about 60 weight percent iron, and most preferably about 30 to about 50 weight percent iron. These catalysts can be unsupported, but are preferably promoted with a refractory metal oxide ($SiO_2$, $Al_2O_3$, etc.), alkali (K, Na, Rb) and/or Group IB metals (Cu, Ag). These catalysts are usually calcined, but usually not reduced, rather they are brought up to reaction temperature directly in the $CO/H_2$ feed.

Co-precipitated iron-based catalysts, including those containing cobalt, can be used. High levels of cobalt in an iron-cobalt alloy are known to produce enhanced selectivity to olefinic products, as described in Stud. Surf Sci. Catal. 7, Pt/A, pg. 432 (1981).

Examples of co-precipitated iron-cobalt catalysts and/or alloys include those described in U.S. Pat. Nos. 2,850,515, 2,686,195, 2,662,090, and 2,735,862; AICHE 1981 Summer Nat'l Meeting Preprint No. 408, "The Synthesis of Light Hydrocarbons from CO and $H_2$ Mixtures over Selected Metal Catalysts" ACS 173rd Symposium, Fuel Division, New Orleans, March 1977; J. Catalysis 1981, No. 72(1), pp. 37-50; Adv. Chem. Ser. 1981, 194, 573-88; Physics Reports (Section C of Physics Letters) 12 No. 5 (1974) pp. 335-374; UK patent application No. 2050859A; J. Catalysis 72, 95-110 (1981); Gmelins Handbuch der Anorganische Chemie 8, Auflage (1959), pg. 59; Hydrocarbon Processing, May 1983, pp. 88-96; and Chem. Ing. Tech. 49 (1977) No. 6, pp. 463-468.

Methods for producing high surface area metal oxides are described, for example, in the French article, "C. R. Acad. Sc. Paris", p. 268 (May 28, 1969) by P. Courte and B. Delmon. Metal oxides with a high surface area are prepared by evaporating to dryness aqueous solutions of the corresponding glycolic acid, lactic acid, malic or tartaric acid metal salts. One oxide that was prepared was $CoFe_2O_4$.

Iron-cobalt spinels which contain low levels of cobalt, in an iron/cobalt atomic ratio of 7:1 to 35:1, are converted to Fischer-Tropsch catalysts upon reduction and carbiding (see, for example, U.S. Pat. No. 4,544,674 to Fiato, et al.). These catalysts tend to exhibit high activity and selectivity to $C_{2-6}$ olefins and low methane production.

ii. Catalyst Supports

The type of support used can influence methane production, which should be minimized. Suitable metal oxide supports or matrices which can be used to minimize methane production include alumina, titania, silica, magnesium oxide, silica-alumina, and the like, and mixtures thereof. Examples include titania, zirconium titanate, mixtures of titania and alumina, mixtures of titania and silica, alkaline earth titanates, alkali titanates, rare earth titanates and mixtures of any one of the foregoing with supports selected from the group consisting of vanadia, niobia, tantala, alumina, silica and mixtures thereof.

In the case of supported ruthenium catalysts, the use of a titania or titania-containing support will result in lower methane production than, for example, a silica, alumina or manganese oxide support. Accordingly, titania and titania-containing supports are preferred.

Typically, the catalysts have a particle size of between 10 and 110 microns, preferably between 20 and 80 microns, more preferably between 25 and 65 microns, and have a density of between 0.25 and 0.9 g/cc, preferably between 0.3 and 0.75 g/cc. The catalysts typically include one of the above-mentioned catalytic metals, preferably including iron for low molecular weight olefin production, on one of the above-mentioned catalyst supports.

iii. Promoters and Noble Metals

Methane selectivity is also influenced by the choice of promoter. Alkali metal promoters are known for reducing the methane selectivities of iron catalysts. Noble metals, such as ruthenium, supported on inorganic refractory oxide supports, exhibit superior hydrocarbon synthesis characteristics with relatively low methane production. Where a noble metal is used, platinum and palladium are generally preferred. Accordingly, alkali metal promoters and/or noble metals can be included in the catalyst bed of the first stage provided that they do not significantly alter the reaction kinetics.

iv. Separation of Products from the Fischer-Tropsch Reaction

The products from Fischer-Tropsch reactions generally include a gaseous reaction product and a liquid reaction product. The gaseous reaction product includes hydrocarbons boiling below about 650° F. (e.g., tail gases through middle distillates). The liquid reaction product (the condensate fraction) includes hydrocarbons boiling above about 650° F. (e.g., vacuum gas oil through heavy paraffins). The product boiling below 650° F. can be separated into a tail gas fraction and a condensate fraction, i.e., about $C_{5-20}$ normal paraffins and higher boiling hydrocarbons, using, for example, a high pressure and/or lower temperature vapor-liquid separator or low pressure separators or a combination of separators.

Products in the $C_{5-20}$, preferably $C_{8-12}$ range can be isolated and used directly to prepare fuel compositions. Products in the relatively low molecular weight fraction (for example, $C_{2-6}$, light gas/naphtha) can be isolated and combined for molecular averaging to arrive at a desired fraction.

It is generally possible to isolate various fractions from a Fischer-Tropsch reaction, for example, by distillation. The fractions include a gasoline fraction (B.P. about 68-450° F./20-232° C.), a middle distillate fraction (B.P. about 250-750° F./121-399° C.), a wax fraction (B.P. about 650-1200° F./343-649° C.) primarily containing $C_{20-50}$ normal paraffins with a small amount of branched paraffins and a heavy fraction (B.P. above about 1200° F./649° C.) and tail gases.

Fischer-Tropsch products tend to have appreciable amounts of olefins in the light fractions (i.e., the naphtha and distillate fuel fractions). Depending on the specifics of the Fischer-Tropsch process, the naphtha can be expected to include more than 50% olefins, most of which are alpha olefins. Distillate fuels can also include some level of olefins (typically between 10 and 30%).

D. Olefin Metathesis/Molecular Averaging

As used herein, the terms "molecular redistribution" and olefin metathesis are used to refer to a process in which a mixture of olefins with a relatively wide size distribution is converted into an olefin stream with a relatively narrow size distribution. The terms "molecular averaging" and "disproportionation" are also used.

The fuel compositions described herein are prepared from a relatively low molecular weight olefinic fraction, such as a $C_{2-4}$ olefinic fraction, and the products of the thermal decarboxylation of fatty acids, via olefin metathesis (molecular averaging). One example of a set of suitable olefin metathesis conditions is described in U.S. Pat. No. 6,369,286 to Dennis O'Rear.

More products in the desired range are produced when the reactants have molecular weights closer to the target molecular weight. Because the low molecular weight olefins and thermal decarboxylation products flank the target molecular weight range of gasoline, diesel, and jet fuel, these represent ideal sources of raw materials for the olefin metathesis reaction. Of course, following fractional distillation and isolation of the product of the olefin metathesis reaction, the other fractions can be isolated and re-subjected to olefin metathesis conditions.

i. Catalysts for Molecular Redistribution/Averaging

A typical dehydrogenation/hydrogenation catalyst includes a platinum component and a typical metathesis catalyst includes a tungsten component. Examples of suitable catalysts are described in U.S. Pat. No. 3,856,876. The individual steps in the overall molecular averaging reaction are discussed in detail below.

ii. Dehydrogenation

If the decarboxylated fatty acids do not include carbon-carbon double bonds, they can be dehydrogenated before the olefin metathesis reaction. Similarly, before or following the olefin metathesis, any alkanes present in the low molecular weight olefin fraction can be dehydrogenated. The dehydrogenation catalyst must have dehydrogenation activity to convert at least a portion of the paraffins to olefins, which are believed to be the actual species that undergo olefin metathesis.

Platinum and palladium or the compounds thereof are preferred for inclusion in the dehydrogenation/hydrogenation component, with platinum or a compound thereof being especially preferred. As noted previously, when referring to a particular metal in this disclosure as being useful, the metal can be present as elemental metal or as a compound of the metal. As discussed above, reference to a particular metal in this disclosure is not intended to limit the invention to any particular form of the metal unless the specific name of the compound is given, as in the examples in which specific compounds are named as being used in the preparations.

The dehydrogenation step can be conducted by passing the decarboxylated fatty acids over a dehydrogenation catalyst under dehydrogenating reaction conditions. If it is desirable to reduce or eliminate the amount of diolefins produced or other undesired by-products, the reaction conversion to internal olefins should preferably not exceed 50%, and more preferably not exceed 30%, but proceed by at least 15-20%.

The dehydrogenation is typically conducted at temperatures between about 500° F. and 1000° F. (260° C. and 538° C.), preferably between about 600° F. and 800° F. (316° C. and 427° C.). The pressures are preferably between about 0.1 and 10 atms, more preferably between about 0.5 and 4 atms absolute pressure (about 0.5 to 4 bars). The LHSV (liquid hourly space velocity) is preferably between about 1 and 50 $hr^{-1}$, preferably between about 20 and 40 $hr^{-1}$. The products generally and preferably include internal olefins.

The dehydrogenation is also typically conducted in the presence of a gaseous diluent, typically and preferably hydrogen. Although hydrogen is the preferred diluent, other art-recognized diluents may also be used, either individually or in admixture with hydrogen or each other, such as steam, methane, ethane, carbon dioxide, and the like. Hydrogen is preferred because it serves the dual-function of not only lowering the partial pressure of the dehydrogenatable hydrocarbon, but also of suppressing the formation of hydrogen-deficient, carbonaceous deposits on the catalytic composite. Hydrogen is typically used in amounts sufficient to insure a hydrogen to hydrocarbon feed mole ratio of about from 2:1 to 40:1, preferably in the range of about from 5:1 to 20:1.

Suitable dehydrogenation catalysts which can be used include Group VIII noble metals, e.g., iron, cobalt, nickel, palladium, platinum, rhodium, ruthenium, osmium, and iridium, preferably on an oxide support.

Less desirably, combinations of Group VIII non-noble and Group VIB metals or their oxides, e.g., chromium oxide, may also be used. Suitable catalyst supports include, for example, silica, silicalite, zeolites, molecular sieves, activated carbon alumina, silica-alumina, silica-magnesia, silica-thoria, silicaberylia, silica-titania, silica-aluminum-thora, silica-alumina-zirconia kaolin clays, montmorillonite clays and the like. In general, platinum on alumina or silicalite afford very good results in this reaction. Typically, the catalyst contains about from 0.01 to 5 wt. %, preferably 0.1 to 1 wt. % of the dehydrogenation metal (e.g., platinum). Combination metal catalysts, such as those described in U.S. Pat. Nos. 4,013,733; 4,101,593 and 4,148,833, can be used.

Since dehydrogenation produces a net gain in hydrogen, the hydrogen may be taken off for other plant uses or as is typically the case, where the dehydrogenation is conducted in the presence of hydrogen, a portion of the recovered hydrogen can be recycled back to the dehydrogenation reactor. Further information regarding dehydrogenation and dehydrogenation catalysts can, for example, be found in U.S. Pat. Nos. 4,046,715; 4,101,593; and 4,124,649. A variety of commercial processes also incorporate dehydrogenation processes, in their overall process scheme, which dehydrogenation processes may also be used in the present process to dehydrogen the paraffinic hydrocarbons. Examples of such processes include the dehydrogenation process portion of the Pacol process for manufacturing linear alkylbenzenes, described in Vora et al., Chemistry and Industry, 187-191 (1990); Schulz R. C. et al., Second World Conference on Detergents, Montreaux, Switzerland (October 1986); and Vora et al., Second World Surfactants Congress, Paris France (May 1988).

If desired, diolefins produced during the dehydrogenation step may be removed by known adsorption processes or selective hydrogenation processes which selectively hydrogenate diolefins to monoolefins without significantly hydrogenating monoolefins. One such selective hydrogenation process known as the DeFine process is described in the Vora et al. Chemistry and Industry publication cited above.

iii. Olefin Metathesis

The relatively low molecular weight fractions (i.e., $C_{2-4}$) and the thermal decarboxylation products are metathesized to form a desired product stream. The average molecular weight will depend on whether the product is to be used for preparing gasoline, diesel, or jet fuel, but typically ranges from about $C_5$ to $C_{20}$. The process involves using an appropriate olefin metathesis catalyst under conditions selected to convert a significant portion of the relatively high molecular weight and relatively low molecular weight fractions to a desired fraction.

The low molecular weight olefin fraction can be used directly in the olefin metathesis reaction. As discussed above, it may be desirable to convert at least a portion of the thermal decarboxylation products into olefins before this step. The olefins are combined and the reaction mixture is subjected to olefin metathesis conditions. The metathesized olefins are then optionally converted into paraffins in a process known as hydrogenation or saturation, although they can be used in fuel compositions without first having been hydrogenated.

Various catalysts are known to catalyze the olefin metathesis reaction. The catalyst mass used in the olefin metathesis reaction must have olefin metathesis activity. Olefin metathesis typically uses conventional catalysts, such as $W/SiO_2$ (or inexpensive variations). Usually, the olefin metathesis catalyst will include one or more of a metal or the compound of a metal from Group VIB or Group VIIB of the Periodic Table of the Elements, which include chromium, manganese, molybdenum, rhenium and tungsten. Preferred for inclusion in the olefin metathesis component are molybdenum, rhenium, tungsten, and the compounds thereof. Particularly preferred for use in the olefin metathesis component is tungsten or a compound thereof. As discussed, the metals described above may be present as elemental metals or as compounds of the metals, such as, for example, as an oxide of the metal. It is also understood that the metals may be present on the catalyst component either alone or in combination with other metals.

The chemistry does not require using hydrogen gas, and therefore does not require relatively expensive recycle gas compressors. The chemistry is typically performed at mild pressures (100-5000 psig). The chemistry is typically thermoneutral and, therefore, there is no need for additional equipment to control the temperature.

Depending on the nature of the catalysts, olefin metathesis (and dehydrogenation) may be sensitive to impurities in the feedstock, such as sulfur- and nitrogen-containing compounds and moisture, and these must be removed prior to the reaction. Typically, if the paraffins being metathesized result from a Fischer-Tropsch reaction, they do not include an appreciable amount of sulfur. However, if the low molecular weight olefins resulted from another process, for example, distillation of petroleum products, they may contain sufficient sulfur impurities to adversely affect the olefin metathesis chemistry. Further, the presence of excess hydrogen in the olefin metathesis zone can affect the equilibrium of the olefin metathesis reaction and to deactivate the catalyst.

Since the composition of the fractions may vary, some routine experimentation will be necessary to identify the contaminants that are present and identify the optimal processing scheme and catalyst to use in carrying out the invention.

The process conditions selected for carrying out the olefin metathesis step will depend upon the olefin metathesis catalyst used. In general, the temperature in the reaction zone will be within the range of from about 400° F. to about 1000° F., with temperatures in the range of from about 500° F. to about 850° F. usually being preferred. In general, the conversion of the olefins by olefin metathesis increases with an increase in pressure. Therefore, the selection of the optimal pressure for carrying out the process will usually be at the highest practical pressure under the circumstances. Accordingly, the pressure in the reaction zone should be maintained above 100 psig, and preferably the pressure should be maintained above 500 psig. The maximum practical pressure for the practice of the invention is about 5000 psig. More typically, the practical operating pressure will below about 3000 psig.

Saturated and partially saturated cyclic hydrocarbons (cycloparaffins, aromatic-cycloparaffins, and alkyl derivatives of these species) can form hydrogen during the molecular averaging reaction. This hydrogen can inhibit the reaction, thus these species should be substantially excluded from the feed.

The desired paraffins can be separated from the saturated and partially saturated cyclic hydrocarbons by deoiling or by use of molecular sieve adsorbents, or by deoiling or by extraction with urea. These techniques are well known in the industry. Separation with urea is described by Hepp, Box and Ray in Ind. Eng. Chem., 45: 112 (1953). Fully aromatic cyclic hydrocarbons do not form hydrogen and can be tolerated. Polycyclic aromatics can form carbon deposits, and these species should also be substantially excluded from the feed. This can be done by use of hydrotreating and hydrocracking.

Tungsten catalysts are particularly preferred for carrying out the molecular averaging step, because the molecular averaging reaction will proceed under relatively mild conditions. When using the tungsten catalysts, the temperature should be maintained within the range of from about 400° F. (200° C.) to about 1000° F. (540° C.), with temperatures above about 500° F. (260° C.) and below about 800° F. being particularly desirable.

The olefin metathesis reaction described above is reversible, which means that the reaction proceeds toward a roughly thermodynamic equilibrium limit. Therefore, since the feed to the olefin metathesis zone has two streams of starting materials with different molecular weights, equilibrium will drive the reaction to produce a product stream having a molecular weight between that of the two streams. The zone in which the olefin metathesis occurs is referred to herein as an olefin metathesis zone. It is desirable to reduce the concentration of the desired products in the olefin metathesis zone to as low a concentration as possible to favor the reactions in the desired direction. As such, some routine experimentation may be necessary to find the optimal conditions for conducting the process.

In the event the catalyst deactivates with the time-on-stream, there are well known processes for regenerating the catalysts.

Any number of reactors can be used, such as fixed bed, fluidized bed, ebulated bed, and the like. An example of a suitable reactor is a catalytic distillation reactor.

When the relatively high molecular weight and relatively low molecular weight fractions are combined, it may be advantageous to take representative samples of each fraction and subject them to olefin metathesis, while adjusting the relative amounts of the fractions until a product with desired properties is obtained. Then, the reaction can be scaled up using the relative ratios of each of the fractions that resulted in the desired product. Using this method, one can "dial in" a molecular weight distribution which can be roughly standardized between batches and result in a reasonably consistent product.

Following olefin metathesis, the olefins are optionally converted back into paraffins using a hydrogenation catalyst and hydrogen. While it is not intended that the present invention be limited to any particular mechanism, it may be helpful in explaining the choice of catalysts to further discuss the sequence of chemical reactions which are believed to be responsible for molecular averaging of the paraffins.

As an example, the following is the general sequence of reactions for ethylene and a $C_{20}$ paraffin, where the $C_{20}$ paraffin is first dehydrogenated to form an olefin and combined with ethylene, the two olefins are molecularly averaged, and, in this example, the resulting metathesized olefins are hydrogenated to form paraffins:

$$C_{20}H_{42} \rightarrow C_{20}H_{40} + H_2$$

$$C_{20}H_{40} + C_2H_4 \rightarrow 2C_{11}H_{22}$$

$$C_{11}H_{22} + H_2 \rightarrow C_{11}H_{24}$$

iv. Refractory Materials

In most cases, the metals in the catalyst mass (dehydrogenation and olefin metathesis) will be supported on a refractory material. Refractory materials suitable for use as a support for the metals include conventional refractory materials used in the manufacture of catalysts for use in the refining industry. Such materials include, but are not necessarily limited to, alumina, zirconia, silica, boria, magnesia, titania and other refractory oxide material or mixtures of two or more of any of the materials. The support may be a naturally occurring material, such as clay, or synthetic materials, such as silica-alumina and borosilicates. Molecular sieves, such as zeolites, also have been used as supports for the metals used in carrying out the dual functions of the catalyst mass. See, for example, U.S. Pat. No. 3,668,268. Mesoporous materials such as MCM-41 and MCM48, such as described in Kresge, C. T., et al., Nature (Vol. 359) pp. 710-712, 1992, may also be used as a refractory support. Other known refractory supports, such as carbon, may also serve as a support for the active form of the metals in certain embodiments. The support is preferably non-acidic, i.e., having few or no free acid sites on the molecule. Free acid sites on the support may be neutralized by means of alkali metal salts, such as those of lithium. Alumina, particularly alumina on which the acid sites have been neutralized by an alkali salt, such as lithium nitrate, is usually preferred as a support for the dehydrogenation/hydrogenation component, and silica is usually preferred as the support for the metathesis component. The preferred catalyst/support for the dehydrogenation step is Pt'silicalite, as this combination is believed to show the best resistance to fouling.

The amount of active metal present on the support may vary, but it must be at least a catalytically active amount, i.e., a sufficient amount to catalyze the desired reaction. In the case of the dehydrogenation/hydrogenation component, the active metal content will usually fall within the range from about 0.01 weight percent to about 50 weight percent on an elemental basis, with the range of from about 0.1 weight percent to about 20 weight percent being preferred. For the olefin metathesis component, the active metals content will usually fall within the range of from about 0.01 weight percent to about 50 weight percent on an elemental basis, with the range of from about 0.1 weight percent to about 25 weight percent being preferred.

In those embodiments where the thermal decarboxylation fraction is subjected to dehydrogenation conditions, the dehydrogenation catalyst and the olefin metathesis catalyst are typically present in separate reactors. However, for olefin metathesis catalysts which can tolerate the presence of the hydrogen generated in the dehydrogenation step, it may be possible to perform both steps in a single reactor. In a reactor having a layered fixed catalyst bed, the two components may, in such an embodiment, be separated in different layers within the bed.

If it is desirable to hydrogenate the olefins from the molecular averaging chemistry, it may be necessary to include an additional hydrogenation step in the process, since the hydrogenation of the olefins must take place after the molecular averaging step.

iv. Feedstocks for the Molecular Averaging Reaction

Examples of preferred feedstocks for the molecular averaging reaction include feedstocks with an average molecular weight of $C_{2-4}$ (low molecular weight fraction) and $C_{10-20}$ (thermal decarboxylation fraction). The low molecular weight fraction can be derived, in whole or in part, from Fischer-Tropsch synthesis, as described above, but can also be derived, in whole or in part, from other sources. The thermal decarboxylation fraction can also include, in part, petroleum feedstocks, for example, those derived from crude oil, in the same molecular weight range, or in some embodiments, a higher molecular weight range.

Depending on the olefin metathesis catalysts, the feedstocks may need to exclude appreciable amounts of heteroatoms, diolefins, alkynes or saturated $C_6$ cyclic compounds. If any heteroatoms or saturated $C_6$ cyclic compounds are present in the feedstock, they may have to be removed before the molecular averaging reaction. Heteroatoms, diolefins and alkynes can be removed by hydrotreating. Saturated cyclic hydrocarbons can be separated from the desired feedstock paraffins by adsorption with molecular sieves or by deoiling or by complexing with urea.

Molecular averaging converts the fractions to a product that includes a significant fraction in the $C_{5-20}$ range that can be used for preparing a distillate fuel composition. The product is preferably isomerized to increase the octane value and lower the pour, cloud and smoke point. The product can also be hydrotreated and/or blended with suitable additives for use as a distillate fuel composition.

In one embodiment, one or both of the feeds to the molecular averaging reaction is isomerized before the molecular averaging reaction. Incorporation of isoparaffins into the molecular averaging reaction provides a product stream that includes isoparaffins in the distillate fuel range which have relatively high octane values.

In another embodiment, the alpha olefins in the light naphtha and gas are converted into internal olefins (either normal internal or iso-internal olefins). When these materials are averaged against any internal olefins present in the thermal decarboxylation products, the yield of intermediate fuels is increased.

Preferably, after performing Fischer-Tropsch synthesis on syngas, and before performing the molecular averaging reaction (olefin metathesis), hydrocarbons in the distillate fuel range are separately isolated, for example, via fractional distillation. The wax and/or heavy fraction are then dehydrogenated, the naphtha and/or light gas fractions are added to the resulting olefinic mixture, and reaction mixture is molecularly averaged by subjecting the olefins to olefin metathesis conditions.

It may be advantageous to take representative samples of each fraction and subject them to molecular averaging reactions, adjusting the relative proportions of the fractions until a product with desired properties is obtained. Then, the reaction can be scaled up using the relative ratios of each of the fractions that resulted in the desired product. Using this method, one can "dial in" a molecular weight distribution which can be roughly standardized between batches and result in a reasonably consistent product.

V. Optional Method Steps

A. Isomerization Chemistry

Optionally, various fractions resulting from the thermal decarboxylation of free fatty acids (i.e., a fraction already in the desired molecular weight range for preparing the desired distillate fuel product), the fractions being molecularly averaged, and/or the products of the molecular averaging chemistry, are isomerized. The isomerization products have more branched paraffins, thus improving their pour, cloud and freeze points. Isomerization processes are generally carried out at a temperature between 200° F. and 700° F., preferably 300° F. to 550° F., with a liquid hourly space velocity between 0.1 and 2, preferably between 0.25 and 0.50. The hydrogen content is adjusted such that the hydrogen to hydrocarbon mole ratio is between 1:1 and 5:1. Catalysts useful for isomerization are generally bifunctional catalysts comprising a hydrogenation component (preferably selected from the Group VIII metals of the Periodic Table of the Elements, and more preferably selected from the group consisting of nickel, platinum, palladium and mixtures thereof) and an acid component. Examples of an acid component useful in the preferred isomerization catalyst include a crystalline zeolite, a halogenated alumina component, or a silica-alumina component. Such paraffin isomerization catalysts are well known in the art.

Optionally, but preferably, the resulting product is hydrogenated. The hydrogen can come from a separate hydrogen plant, can be derived from syngas, made directly from methane or other light hydrocarbons, or come directly from the thermal decarboxylation step.

After hydrogenation, which typically is a mild hydrofinishing step, the resulting distillate fuel product is highly paraffinic. Hydrofinishing is done after isomerization. Hydrofinishing is well known in the art and can be conducted at temperatures between about 190° C. to about 340° C., pressures between about 400 psig to about 3000 psig, space velocities (LHSV) between about 0.1 to about 20, and hydrogen recycle rates between about 400 and 1500 SCF/bbl.

The hydrofinishing step is beneficial in preparing an acceptably stable fuel. Fuels that do not receive the hydrofinishing step may be unstable in air and light due to olefin polymerization. To counter this, they may require higher than typical levels of stability additives and antioxidants.

B. Thermal Cracking

In some embodiments, for example, the embodiment wherein the thermal decarboxylation products are not subjected to molecular averaging with low molecular weight olefins, the viscosity of the products can be slightly higher than that of diesel fuel. The viscosity can be lowered by thermally cracking, hydrocracking, or pyrolyzing the composition, preferably in the presence of a Lewis acid catalyst.

Methods for thermally cracking or hydrocracking hydrocarbons are known to those of skill in the art. Representative Lewis acid catalysts and reactions conditions are described, for example, in Fluid Catalytic Cracking II, Concepts in Catalyst Design, ACS Symposium Series 452, Mario Occelli, editor, American Chemical Society, Washington, D.C., 1991. The pyrolysis of vegetable oils is described in Alencar, et al., Pyrolysis of Tropical Vegetable Oils, J. Ag. Food Chem., 31:1268-1270 (1983). The hydrocracking of vegetable oils is described in U.S. Pat. No. 4,992,605 to Craig, et al.

In one embodiment, the fuel additive composition is heated to a temperature of between approximately 100° and 500° F., preferably to between approximately 100° and 200° F., and more preferably to between approximately 150° and 180° F., and then passed through a Lewis acid catalyst. Any Lewis acid catalyst that is effective for thermally cracking hydrocarbons can be used. Suitable catalysts for use in the present invention include, but are not limited to, zeolites, clay montmorrilite, aluminum chloride, aluminum bromide, ferrous chloride and ferrous bromide. Preferably, the catalyst is a fixed-bed catalyst.

A preferred catalyst is prepared by coating a ceramic monolithic support with lithium metal. Supports of this type are manufactured, for example, by Dow-Corning. Lithium is coated on the support by first etching the support with zinc chloride, then brushing lithium onto the support, and then baking the support.

The retention time through the Lewis acid catalyst can be as little as one second, although longer retention times do not adversely affect the product.

After passing through the Lewis acid catalyst, the derivative stream is then preferably heated to a temperature of between approximately 200° and 600° F., preferably between approximately 200° and 230° F., to thermally crack the product. The resulting product is suitable for blending with distillate fuel, such as gasoline, diesel, or jet fuel, to form an alternative fuel composition.

C. Hydrotreating and/or Hydrocracking Chemistry

Fractions used in the molecular averaging chemistry may include heteroatoms such as sulfur or nitrogen, diolefins and alkynes that may adversely affect the catalysts used in the molecular averaging reaction. If sulfur impurities are present in the starting materials, they can be removed using means well known to those of skill in the art, for example, extractive Merox, hydrotreating, adsorption, etc. Nitrogen-containing impurities can also be removed using means well known to those of skill in the art. Hydrotreating and hydrocracking are preferred means for removing these and other impurities from the heavy wax feed component. Removal of these components from the light naphtha and gas streams must use techniques that minimize the saturation of the olefins in these streams. Extractive Merox is suitable for removing sulfur compounds and acids from the light streams. The other compounds can be removed, for example, by adsorption, dehydration of alcohols, and selective hydrogenation. Selective hydrogenation of diolefins, for example, is well known in the art. One example of a selective hydrogenation of diolefins in the presence of olefins is UOP's DeFine process.

Hydrogenation catalysts can be used to hydrotreat the products resulting from the Fischer-Tropsch, molecular averaging and/or isomerization reactions, although it is preferred not to hydrotreat the products from the Fischer-Tropsch reaction, since the olefins necessary for the molecular averaging step would be hydrogenated.

As used herein, the terms "hydrotreating" and "hydrocracking" are given their conventional meaning and describe processes that are well known to those skilled in the art. Hydrotreating refers to a catalytic process, usually carried out in the presence of free hydrogen, in which the primary purpose is the desulfurization and/or denitrification of the feedstock. Generally, in hydrotreating operations, cracking of the hydrocarbon molecules, i.e., breaking the larger hydrocarbon molecules into smaller hydrocarbon molecules, is minimized and the unsaturated hydrocarbons are either fully or partially hydrogenated.

Hydrocracking refers to a catalytic process, usually carried out in the presence of free hydrogen, in which the cracking of the larger hydrocarbon molecules is a primary purpose of the operation. Desulfurization and/or denitrification of the feed stock usually will also occur.

Catalysts used in carrying out hydrotreating and hydrocracking operations are well known in the art. See, for example, U.S. Pat. Nos. 4,347,121 and 4,810,357 for general descriptions of hydrotreating, hydrocracking, and typical catalysts used in each process.

Suitable catalysts include noble metals from Group VIIIA, such as platinum or palladium on an alumina or siliceous matrix, and unsulfided Group VIIIA and Group VIB, such as nickel-molybdenum or nickel-tin on an alumina or siliceous matrix. U.S. Pat. No. 3,852,207 describes suitable noble metal catalysts and mild hydrotreating conditions. Other suitable catalysts are described, for example, in U.S. Pat. Nos. 4,157,294 and 3,904,513. The non-noble metal (such as nickel-molybdenum) hydrogenation metal are usually present in the final catalyst composition as oxides, or more preferably or possibly, as sulfides when such compounds are readily formed from the particular metal involved. Preferred non-noble metal catalyst compositions contain in excess of about 5 weight percent, preferably about 5 to about 40 weight percent molybdenum and/or tungsten, and at least about 0.5, and generally about 1 to about 15 weight percent of nickel and/or cobalt determined as the corresponding oxides. The noble metal (such as platinum) catalyst contains in excess of 0.01 percent metal, preferably between 0.1 and 1.0 percent metal. Combinations of noble metals may also be used, such as mixtures of platinum and palladium.

The hydrogenation components can be incorporated into the overall catalyst composition by any one of numerous procedures. The hydrogenation components can be added to matrix component by co-mulling, impregnation, or ion exchange and the Group VI components, i.e., molybdenum and tungsten can be combined with the refractory oxide by impregnation, co-mulling or co-precipitation. Although these components can be combined with the catalyst matrix as the sulfides, that may not be preferred, as the sulfur compounds may interfere with some molecular averaging or Fischer-Tropsch catalysts.

The matrix component can be of many types including some that have acidic catalytic activity. Ones that have activity include amorphous silica-alumina or may be a zeolitic or non-zeolitic crystalline molecular sieve. Examples of suitable matrix molecular sieves include zeolite Y, zeolite X and the so-called ultra stable zeolite Y and high structural silica:alumina ratio zeolite Y such as that described in U.S. Pat. Nos. 4,401,556, 4,820,402 and 5,059,567. Small crystal size zeolite Y, such as that described in U.S. Pat. No. 5,073,530, can also be used. Non-zeolitic molecular sieves which can be used include, for example, silicoaluminophosphates (SAPO), ferroaluminophosphate, titanium aluminophosphate, and the various ELAPO molecular sieves described in U.S. Pat. No. 4,913,799 and the references cited therein. Details regarding the preparation of various non-zeolite molecular sieves can be found in U.S. Pat. No. 5,114,563 (SAPO); U.S. Pat. No. 4,913,799 and the various references cited in U.S. Pat. No. 4,913,799. Mesoporous molecular sieves can also be used, for example, the M41S family of materials (J. Am. Chem. Soc. 1992, 114, 10834-10843), MCM-41 (U.S. Pat. Nos. 5,246,689, 5,198,203 and 5,334,368), and MCM-48 (Kresge et al., Nature 359 (1992) 710).

Suitable matrix materials may also include synthetic or natural substances as well as inorganic materials such as clay, silica and/or metal oxides such as silica-alumina, silica-magnesia, silica-zirconia, silica-thoria, silica-berylia, silica-titania as well as ternary compositions, such as silica-alumina-thoria, silica-alumina-zirconia, silica-alumina-magnesia, and silica-magnesia zirconia. The latter may be either naturally occurring or in the form of gelatinous precipitates or gels including mixtures of silica and metal oxides. Naturally occurring clays which can be composited with the catalyst include those of the montmorillonite and kaolin families. These clays can be used in the raw state as originally mined or initially subjected to calumniation, acid treatment or chemical modification.

Furthermore, more than one catalyst type may be used in the reactor. The different catalyst types can be separated into layers or mixed. Typical hydrotreating conditions vary over a wide range. In general, the overall LHSV is about 0.25 to 2.0, preferably about 0.5 to 1.0. The hydrogen partial pressure is greater than 200 psia, preferably ranging from about 500 psia to about 2000 psia. Hydrogen recirculation rates are typically greater than 50 SCF/Bbl, and are preferably between 1000 and 5000 SCF/Bbl. Temperatures range from about 300° F. to about 750° F., preferably ranging from 450° F. to 600° F.

D. Filtration of the Fuel Composition

In one embodiment, the fuel composition is filtered, preferably through a filter with a pore size of between approximately 5 and 50 microns, more preferably, between approximately 10 and 20 microns, to remove solid impurities. This can be especially important when animal fats are used, since rendering processes can inadvertently place small pieces of bone and other particulate matter in the animal fat that needs to be removed.

Modifications and variations of the present invention will be obvious to those skilled in the art from the foregoing detailed description of the invention. The disclosures of each of the patents and papers discussed above are incorporated herein by reference in their entirety.

I claim:

1. A method for preparing a hydrocarbon product, comprising the steps of: a) performing thermal decarboxylation on a feedstock comprising fatty acids in the C10-20 range, to form a thermal decarboxylation product stream,
   b) combining the thermal decarboxylation product stream with an olefin-containing material substantially in the C2-8 range to form a reaction mixture, and
   c) subjecting the reaction mixture to molecular averaging to form a hydrocarbon product,
   wherein, if the thermal decarboxylation product is saturated, a dehydrogenation step is performed on the thermal decarboxylation product before the molecular averaging step is performed.

2. The method of claim 1, wherein the C10-20 fatty acid is obtained by hydrolyzing a vegetable oil or animal fat.

3. The method of claim 1, wherein the hydrocarbon product of the molecular averaging step is fractionated, and a product in the distillate fuel range is obtained.

4. The method of claim 3, wherein the product in the distillate fuel range is in the gasoline fuel range.

5. The method of claim 4, wherein at least a portion of the hydrocarbons in the gasoline range are isomerized to provide branched hydrocarbons.

6. The method of claim 3, wherein the product in the distillate fuel range is in the diesel or jet fuel range.

7. The method of claim 1, wherein the olefin-containing material substantially in the C2-8 range is obtained by Fisher-Tropsch synthesis.

8. The method of claim 7, wherein the Fisher-Tropsch synthesis was performed using syngas derived in whole or in part from natural gas.

9. The method of claim 7, wherein the Fisher-Tropsch synthesis was performed using syngas derived in whole or in part from coal.

10. The method of claim 7, wherein Fisher-Tropsch synthesis was performed using syngas derived in whole or in part from lignin.

11. The method of claim 1, wherein the product is subjected to hydrogenation, hydrotreatment, and/or hydrofinishing steps.

12. The method of claim 1, wherein all or part of the fatty acids are derived from the hydrolysis of a triglyceride.

13. The method of claim 12, wherein the hydrolysis occurs immediately prior to the thermal decarboxylation.

14. The method of claim 1, wherein the source of fatty acids comprises trap grease.

* * * * *